United States Patent [19]
Feniak

[11] 3,880,821
[45] Apr. 29, 1975

[54] HALOGENATED BUTYL RUBBER OF IMPROVED SCORCH CHARACTERISTICS

[75] Inventor: George Feniak, Wyoming, Ontario, Canada

[73] Assignee: Polysar Limited, Sarhia, Ontario, Canada

[22] Filed: Oct. 23, 1973

[21] Appl. No.: 408,542

[30] Foreign Application Priority Data
Nov. 24, 1972 Canada.............................. 157388

[52] U.S. Cl......... 260/85.3 H; 260/5; 260/31.8 DR; 260/33.6 AQ; 260/888; 260/890
[51] Int. Cl. ........................ C08d 9/04; C08c 11/34
[58] Field of Search.... 260/23.7 H, 85.3 H, 23.7 M, 260/782

[56] References Cited
UNITED STATES PATENTS

| | | | |
|---|---|---|---|
| 2,958,667 | 11/1960 | Eby et al...................... | 260/23.7 H |
| 3,190,865 | 6/1965 | Miller............................. | 260/23.7 H |
| 3,255,154 | 6/1966 | Dudley............................... | 260/782 |
| 3,458,461 | 7/1969 | Mihal............................ | 260/23.7 H |
| 3,534,123 | 10/1970 | Bostock et al................ | 260/23.7 H |

OTHER PUBLICATIONS
Cowan, J. Amer. Oil Chemists Soc., 39, 534–545 (1962).

*Primary Examiner*—Murray Tillman
*Assistant Examiner*—Arthur H. Koeckert
*Attorney, Agent, or Firm*—Stevens, Davis, Miller & Mosher

[57] ABSTRACT

The scorch characteristics of halogenated butyl rubber compounds are improved by the addition of one of or a mixture of the free acid or the magnesium, aluminum, calcium or barium salts of oligomers of linoleic acid.

7 Claims, No Drawings

HALOGENATED BUTYL RUBBER OF IMPROVED SCORCH CHARACTERISTICS

This invention relates to the stabilization of halogenated butyl rubber against premature cross-linking during compounding.

Halogenated butyl rubbers are fast curing and, as a result, their compounds tend to be susceptible to premature vulcanization when part or all of the curing ingredients are present and before all of the fabrication and shaping stages have been completed. When such premature vulcanization takes place, the compounds become tough and unworkable. Premature vulcanization is commonly referred to as "scorchingg". The problem can be reduced by the use of certain scorch retarders. However, up to the present, the known scorch retarders are not entirely satisfactory in providing adequate time for processing or compounding in the production of the final shaped articles.

It is an objective of this invention to provide vulcanizable halogenated butyl compounds having improved scorch characteristics.

It has now been discovered that vulcanizable compositions comprising halogenated butyl have longer scorch times when a scorch retarding agent selected from at least one of the free acid and the magnesium, aluminum, calcium or barium salts of an oligomer of linoleic acid is incorporated into the composition.

The term "butyl rubber" as employed herein is intended to refer essentially to a vulcanizable rubbery copolymer containing from about 85 to 99.5% combined isoolefin having from 4 to 8 carbon atoms and 0.5 to 15% combined conjugated diolefin having from 4 to 8 carbon atoms. Such copolymers and their preparation are well known in the industry. The isoolefin, such as isobutylene, is mixed with a conjugated diolefin, such as butadiene or isoprene, and an inert diluent selected from $C_4$ to $C_6$ aliphatic alkenes and chlorinated hydrocarbons such as methyl chloride, ethyl chloride, methylene chloride and ethylene dichloride. The monomers may form from 10 to 50% by weight of the total monomer/diluent mixture. The mixture is polymerized in a reactor at a temperature in the range from about 0° to about −165°C using cationic catalysts well known in the art. The polymerization reaction proceeds rapidly to produce a copolymer in the form of a slurry in the diluent.

The preferred copolymer which is used to produce the halogenated butyl rubber of this invention is a copolymer is isobutylene and isoprene, preferably having an isobutylene content of from 97 to 99.5 weight per cent, most preferably from 98 to 99 weight per cent, and an isoprene content of from 0.5 to 3 weight per cent, most preferably from 1 to 2 weight per cent. The halogenated butyl rubber contains chlorine or bromine in an amount from about 0.5 to about 15 weight per cent. It contains not more than one atom of chlorine or not more than three atoms of bromine per double bond present in the original copolymer and preferably it contains from 0.5 to 2 weight per cent of chlorine or from 0.5 to 5 weight per cent bromine. Most preferably the halogenated polymer is a brominated butyl rubber containing from 1.5 to 2.5 weight percent bromine. The butyl rubber may be halogenated by means well known in the art. The solid rubber may be reacted on a hot rubber mill with a compound which releases halogen such as nitrogen halo-succinimide and nitrogen halo-hydantoin. Alternatively, the butyl rubber may be dissolved in an inert hydrocarbon solvent such as pentane, hexane or cyclohexane and halogenated by addition to the solution of elemental chlorine or bromine and the halogenated butyl recovered therefrom.

Halogenated butyl rubbers may be used in various applications where rubbers are generally used and are particularly useful in applications involving adhesion to, or covulcanization with, more highly unsaturated rubbers such as natural rubber and synthetic unsaturated rubbers selected from polyisoprene, polybutadiene, styrene-butadiene polymers and ethylene-propylene-diene polymers.

The scorch retarding agent used in this invention is at least one of the free acid or the magnesium, aluminum, calcium and barium salts of an oligomer of linoleic acid. Linoleic acid is an organic monocarboxylic acid compound containing two carbon-carbon double bonds. It is well known in the art that this compound will undergo oligomerization particularly to form the dimer and the trimer. Such oligomerization is achieved by the action of heat, optionally in the presence of a catalyst, to yield a compound thought to be, for the dimer, a tetra-substituted cyclohexene having two carboxyl groups and one carbon-carbon double bond external to the cyclohexene ring. Preferred oligomers of linoleic acid are the dimer and the trimer. Salts of the dimeric or trimeric acid may be readily formed such as by reacting the acid with aqueous potassium or sodium hydroxide to yield a water soluble compound which may then be reacted with an aqueous solution of, for example, calcium chloride to yield the corresponding calcium salt.

The quantity of scorch retarding agent required to give the degree of scorch retardation desired will depend on the type and amount of other materials present in the vulcanizable composition. Generally, the quantity of scorch retarding agent is in the range of from about 0.5 parts to about 5 parts by weight per 100 parts by weight of the polymeric component, i.e. the total quantity of rubber, in the vulcanizable composition. Preferably the amount of scorch retarding agent is from 0.75 to 2.5 parts by weight per 100 parts by weight of the polymeric component of the vulcanizable composition.

The vulcanizable composition of this invention may contain, in addition to the halogenated butyl and scorch retarding agent, other unsaturated rubbers and conventional compounding ingredients such as carbon black, other fillers, oil, wax, antioxidant, and other processing aids. Other unsaturated rubbers include natural rubber and synthetic unsaturated rubbers selected from polyisoprene, polybutadiene, styrene-butadiene polymers and ethylene-propylene-diene polymers. The polymeric component of the vulcanizable composition thereby is halogenated butyl and may optionally contain at least one of the aforesaid unsaturated rubbers. The halogenated butyl forms at least 20 per cent by weight and up to 100 per cent by weight of the polymeric component. The quantity of conventional compounding ingredients contained in the vulcanizable composition will depend on the use for the final shaped article and may be varied as well known in the art. The quantity of carbon black in the composition will generally be in the range of from 20 parts by weight to 100 parts by weight per 100 parts by weight of the polymeric components.

The vulcanizable composition is vulcanized, on heating for a period of time, by reaction with zinc oxide, as for compositions containing halogenated butyl as the only polymeric component, or with sulphur or sulphur compound vulcanization agents alone or in combination with zinc oxide as when the polymeric component is halogenated butyl alone or in admixture with at least one other unsaturated rubber.

The vulcanizable composition is produced by mixing the halogenated butyl rubber with the scorch retarding agent. The process whereby the rubber and scorch retarding agent are mixed may be by dry state mixing or it may be by mixing in an aqueous phase. When the mixing is in the dry state, dry halogenated butyl and the dry retarding agent are mixed by a rubber compounding means such as in a Banbury material mixer or on a rubber mill under conditions well known in the art and normally used for mixing such halogenated butyl rubber with compounding ingredients. The scorch retarding agent may be mixed with the halogenated butyl as a separate step in the compounding process or may be mixed together with other compounding ingredients. When aqueous phase mixing is used, the halogenated butyl may be recovered from the halogenation reaction as a slurry in water and an aqueous solution of the scorch retarding agent may be mixed with said slurry, the halogenated butyl mixed with the scorch retarding agent being recovered therefrom and dried.

The invention is illustrated by the following examples, the scope of the invention not being limited thereto.

EXAMPLE 1

Using a Banbury mixing procedure, with the rotor running at 77 rpm, the rotor and gates at 215°F and steam and water to the Banbury both off, the following compound was mixed for a total mixing time of 5 minutes, the quantities being parts by weight:

| | |
|---|---|
| Bromobutyl | 550 |
| Natural rubber | 185 |
| Stearic acid | 7.3 |
| Carbon black | 440 |
| Paraffinic oil | 110 |
| Tackifier resin | 29 |

Using 1200 parts of this compound, the following ingredients were incorporated by mixing on a rubber compound mill, the temperature of the rolls being about 85°F:

| | | |
|---|---|---|
| Zinc oxide | 33.1 | parts by weight |
| Benzothiazyl disulphide | 3.3 | " |
| Alkyl phenol disulphide | 6.6 | " |

Using 200g portion, the additive shown in Table I were incorporated, using the mill mixing procedure given above. Scorch times for the compounds and stress-strain properties of the vulcanizates, which had been vulcanized for 30 minutes at 165°C, were then determined.

The bromobutyl used was a commercial sample containing 2.1 weight per cent of bromine and having a Mooney (ML 1 + 12 at 125°C) of 42. The carbon black used was a general purpose furnace black, the paraffinic oil is a petroleum oil having a specific gravity of 0.88 and a Saybolt Universal viscosity of 350 seconds at 80°F, the tackifier resin used was a product of Rohm & Haas sold under the tradename Amberol ST-149 and the alkyl phenol disulphide was a product of Pennwalt Chemical Corporation sold under the tradename Vultac 5. The calcium salt of the dimer acid was prepared as follows: 57g of linoleic acid dimer (Empol Dimer Acid 1022, obtained from Emery Industries Inc.) was added to a stirred solution of 10g NaOH in 500 ml of water. The reaction mixture was stirred and heated on a hot plate. When the temperature had reached about 60°C, the mixture became very viscous and was then poured into a stirred solution of 28g of $CaCl_2$ in 200 ml of water. The resultant pale yellow slurry was stirred and heated to about 80°C for 15 min., collected by filtration, washed thoroughly with water and air dried. The product was an off-white powder. The scorch time was determined as the time when the Mooney had increased by 5 Mooney points ($t_5$) above the minimum Mooney, using a test temperature of 125°C and the stress-strain properties were determined using ASTM procedures.

Comparison of the scorch times for experiments 1, 2 and 3 and for 4 and 5 and for 6 and 7 show that the addition of the calcium salt of the dimer of linoleic acid does cause an increase in the scorch time in different recipes. The stress-strain properties show that the presence of the scorch retarder does not detract from the properties of the vulcanizates.

TABLE I

| Experiment No. | Benzothiazyl Disulphide | Magnesium Oxide | Calcium salt of Dimer of Linoleic Acid | Scorch Time $t_s$/125°C | Tensile Strength | 300% Modulus | Elongation % |
|---|---|---|---|---|---|---|---|
| | g | g | g | minutes | Kg/cm² | Kg/cm² | |
| 1 (Control) | 0 | 0 | 0 | 6.62 | 106 | 54 | 560 |
| 2 | 0 | 0 | 1.1 | 8.77 | 100 | 56 | 520 |
| 3 | 0 | 0 | 2.2 | 9.57 | 101 | 58 | 500 |
| 4 (Control) | 0 | 1.1 | 0 | 7.02 | 100 | 58 | 500 |
| 5 | 0 | 1.1 | 1.1 | 15.33 | 101 | 43 | 570 |
| 6 (Control) | 1.1 | 0 | 0 | 7.18 | 111 | 51 | 600 |
| 7 | 1.1 | 0 | 1.1 | 9.40 | 115 | 47 | 610 |

EXAMPLE 2

A compound identical with that of Example 1 was prepared in a Banbury mixer. Into 1200 parts of this compound was mixed, using a rubber compounding mill, the following:

| | | |
|---|---|---|
| Zinc oxide | 32.9 | parts by weight |
| Benzothiazyl Disulphide | 6.6 | " |
| Vultac 5 | 6.6 | " |

One-gram quantities of the additives listed in Table II were added, using a rubber compounding mill, to 100g portions of the above compound and the scorch time was determined for each sample.

TABLE II

| Experiment No. | Additive | Scorch Time $t_s$/125°C Minutes |
| --- | --- | --- |
| 1 | Nil (Control) | 6.97 |
| 2 | Calcium salt of dimer of linoleic acid | 10.75 |
| 3 | Calcium salt of trimer of linoleic acid | 11.9 |
| 4 | Barium salt of dimer of linoleic acid | 12.45 |
| 5 | Barium salt of trimer of linoleic acid | 15.5 |
| 6 | Nil (Control) | 6.37 |
| 7 | Dimer of linoleic acid | 8.87 |
| 8 | Trimer of linoleic acid | 9.0 |
| 9 | Magnesium salt of dimer of linoleic acid | 7.4 |
| 10 | Magnesium salt of trimer of linoleic acid | 10.41 |
| 11 | Aluminum salt of dimer of linoleic acid | 7.06 |
| 12 | Aluminum salt of trimer of linoleic acid | 7.45 |

The linoleic acid dimer and trimer were commercial products available from Emergy Industries Ltd. as Empol Dimer 1022 and Empol Trimer 1040 respectively. The salts were prepared as described in Example 1.

EXAMPLE 3

Bromobutyl-containing compounds were prepared using the ingredients in Part A of Table III. The bromobutyl had the bromine contents and Mooney as (ML 1 + 12 at 125°C) shown. To 100-gram portions of each compound was added one gram of the calcium salt of the dimer acid of Example 1. Scorch times were determined on these two portions and on a portion of each original compound, as controls, with the results shown in Part B of Table III.

TABLE III

PART A

| Experiment No. | 1 | 2 | 3 | 4 |
| --- | --- | --- | --- | --- |
| Bromobutyl | 75 | 75 | 100 | 100 |
| Wt. of bromine of bromobutyl | 1.9 | 1.65 | 1.9 | 1.65 |
| Mooney of bromobutyl | 44 | 43.5 | 44 | 43.5 |
| Natural Rubber | 25 | 25 | — | — |
| General purpose furnace carbon black | 62.5 | 62.5 | 62.5 | 62.5 |
| Stearic acid | 1 | 1 | 1 | 1 |
| Benzothiazyl disulphide | 1.25 | 1.25 | 1.25 | 1.25 |
| Paraffin oil | 14 | 14 | 14 | 14 |
| Tackifier resin | 4 | 4 | 4 | 4 |
| Dipentamethylene thiuram tetrasulphide | 0.2 | 0.2 | — | — |
| Zinc oxide | 5 | 5 | 5 | 5 |
| Sulphur | — | — | 0.5 | 0.5 |
| 4,4'-Dithiomorpholine | 0.15 | 0.15 | — | — |

PART B

| | 1 | 2 | 3 | 4 |
| --- | --- | --- | --- | --- |
| Calcium salt of linoleic acid dimer | 0* | 1 gram | 0* | 1 gram |
| Scorch time $t_s$/135°C (mins.) | 10.88 | 15.77 | 10.2 | 14.85 |

*Control

EXAMPLE 4

Using a Model B Banbury, a masterbatch was prepared of the following components, using the procedure of Example 1, all parts being parts by weight.

| | |
| --- | --- |
| Ethylene-propylene-ethylidene norbornene polymer* | 160 |
| Bromobutyl | 180 |
| Styrene-butadiene rubber | 100 |
| Natural rubber | 360 |
| Fast extruding furnace carbon black | 400 |
| Stearic acid | 8 |
| Light paraffinic oil | 96 |
| Paraffin wax | 12 |

*Royalene 502, sold by United States Rubber Co. Into 1200 parts of this masterbatch were blended on a cool rubber compounding mill the following:

Into 1200 parts of this masterbatch were blended on a cool rubber compounding mill the following:

| | | |
| --- | --- | --- |
| Zinc oxide | 22 | parts |
| Sulphur | 3.7 | " |
| Benzothiazyl disulphide | 5.5 | " |
| Vultac 5 | 9 | " |

This compound was divided into portions of 150g weight and to each portion was added the quantity shown in Table IV of the calcium salt of the dimer of linoleic acid and the scorch time was then determined on each sample.

TABLE IV

| Experiment No. | Quantity of Calcium Salt of linoleic acid dimer g (phr) | | Scorch Time $t_s$/135°C minutes |
| --- | --- | --- | --- |
| 1* | 0 | (0) | 5.63 |
| 2 | 0.45 | (0.5) | 6.55 |
| 3 | 1.8 | (2.0) | 7.97 |
| 4 | 4.5 | (5.0) | 9.92 |

*Control

The effect on the scorch time of increasing the quantity of the scorch retarding agent in the compound can clearly be seen.

EXAMPLE 5

Using a mill mixing procedure a vulcanizable mixture was prepared using a sample of chlorobutyl as the rubber component, the contents of the mixture being as given in Table V. The mixture was divided into two equal portions, and to one portion was added 1g of the calcium salt of the dimer of linoleic acid. The scorch time was determined for each portion of the mixture.

TABLE V

| | |
| --- | --- |
| Chlorobutyl | 200 |
| General purpose furnace black | 125 |
| Stearic acid | 2 |
| Light paraffinic oil | 28 |
| Tackifier resin | 8 |
| Zinc oxide | 10 |
| Benzothiazyl disulphide | 2.5 |
| Sulphur | 1 |

| | Portion A | Portion B |
| --- | --- | --- |
| Ca salt of dimer of linoleic acid (g) | 0 (Cntl) | 1 |
| Scorch time $t_s$/125°C min. | 12.8 | 19.83 |

The chlorobutyl used had a chlorine content of 1.1 weight per cent and a Mooney (ML 1 + 4 at 125°C) of 56. The presence of the calcium salt of the linoleic acid dimer clearly increases the scorch time of the vulcanizable mixture.

EXAMPLE 6

A compound of bromobutyl was prepared, using a mill mixing procedure, by mixing 200g of bromobutyl, 100g of a semi-reinforcing furnace carbon black, 2g of stearic acid and, as the curing agent, 10g of zinc oxide. The bromobutyl used had a Mooney of 45 and contained 1.9 weight per cent bromine. This compound served as a control. A second compound was prepared in exactly the same manner with the exception that 1g of the calcium salt of the dimer of linoleic acid was added. The scorch time ($t_s$/ 135°C) for the control compound was 10.5 minutes whereas that for the compound containing the scorch retarder of the invention was 11.7 minutes.

What is claimed is:

1. A vulcanizable composition having improved scorch characteristics which comprises a polymeric component comprising halogenated butyl rubber and a scorch retarding agent selected from at least one of the free acid and the aluminum, barium, calcium and magnesium salts of an oligomer of linoleic acid, said scorch retarding agent being present in an amount from about 0.5 parts to about 5 parts by weight per 100 parts by weight of said polymeric component.

2. The composition of claim 1 in which said halogenated butyl rubber is selected from chlorobutyl and bromobutyl.

3. The composition of claim 2 in which said halogenated butyl rubber is a polymer containing, based on hydrocarbons, from 97 to 99.5 weight per cent of isobutylene and from 0.5 to 3 weight per cent of isoprene and, based on halogenated polymer, from 0.5 to 5 weight per cent of bromine.

4. The composition of claim 2 in which said halogenated butyl rubber is a polymer containing, based on hydrocarbons, from 97 to 99.5 weight per cent of isobutylene, and from 0.5 to 3 weight per cent of isoprene and, based on halogenated polymer, from 0.5 to 2 weight per cent of chlorine.

5. The process of manufacture of an improved scorch characteristic vulcanizable composition comprising mixing a polymeric component comprising halogenated butyl rubber with from about 0.5 to about 5 parts by weight per 100 parts by weight of said polymeric component of a scorch retarding agent selected from at least one of the free acid and the aluminum, barium, calcium and magnesium salts of an oligomer of linoleic acid.

6. The process of claim 5 wherein said scorch retarding agent is mixed in the dry state with said polymeric component together with other compounding ingredients.

7. The process of claim 5 wherein said halogenated butyl rubber is mixed with said scorch retarding agent in an aqueous phase, the mixture being recovered therefrom and dried.

* * * * *